United States Patent [19]

Sugimoto et al.

[11] Patent Number: 4,472,328

[45] Date of Patent: Sep. 18, 1984

[54] PROCESS FOR PRODUCING POROUS FILM OR SHEET

[75] Inventors: Masaaki Sugimoto; Yukio Watanabe; Kunio Bizen; Tsunemitsu Hasegawa; Masahiro Morita, all of Kanagawa, Japan

[73] Assignee: Mitsubishi Chemical Industries, Ltd., Tokyo, Japan

[21] Appl. No.: 353,990

[22] Filed: Mar. 2, 1982

[30] Foreign Application Priority Data

Jun. 9, 1981 [JP] Japan .................................. 56-88734
Jul. 22, 1981 [JP] Japan ................................ 56-114865

[51] Int. Cl.$^3$ ............................................. B29H 7/20
[52] U.S. Cl. ...................................... 264/41; 264/147; 264/DIG. 13; 524/481; 524/583
[58] Field of Search ............... 264/DIG. 47, 41, 147, 264/DIG. 13; 524/481, 483, 583

[56] References Cited

U.S. PATENT DOCUMENTS

| | | | |
|---|---|---|---|
| 3,154,461 | 10/1964 | Johnson | 264/DIG. 13 |
| 3,551,538 | 10/1966 | Yamamoto et al. | 264/49 |
| 3,775,521 | 11/1973 | Yamamoto et al. | 264/45.3 |
| 3,882,063 | 5/1975 | Gouw | 264/DIG. 47 |
| 3,903,234 | 9/1975 | Ikeda et al. | 264/DIG. 47 |
| 4,024,213 | 5/1977 | Honda et al. | 264/DIG. 47 |
| 4,154,715 | 5/1979 | Kruse | 524/481 |
| 4,335,026 | 6/1982 | Balinth | 524/483 |

FOREIGN PATENT DOCUMENTS 1044028 7/1963 United Kingdom ....... 264/DIG. 13

*Primary Examiner*—Donald E. Czaja
*Assistant Examiner*—Mary A. Becker
*Attorney, Agent, or Firm*—Sughrue, Mion, Zinn, Macpeak & Seas

[57] ABSTRACT

A process for producing a porous film or sheet, which comprises melt-molding a composition prepared by compounding 100 parts by weight of a polyolefin resin with 25 to 400 parts by weight of a filler and 1 to 100 parts by weight of a liquid or waxy hydrocarbon polymer into film or sheet, and stretching the resulting film or sheet.

5 Claims, No Drawings

PROCESS FOR PRODUCING POROUS FILM OR SHEET

FIELD OF THE INVENTION

This invention relates to a process for producing a porous film or sheet. More particularly, it is concerned with a process for producing a porous film or sheet from a composition prepared by compounding a polyolefin resin with a filler and a liquid or waxy hydrocarbon polymer.

BACKGROUND OF THE INVENTION

Many attempts have heretofore been conducted to compound a polyolefin resin with a filler, melt-mold the composition into a film or sheet, and monoaxially or biaxially stretch the resulting film or sheet to thereby produce a porous film.

However, the thus-produced monoaxially stretched films have problems with respect to anisotropy of physical properties thereof, particularly tearability in longitudinal (or stretched) direction and surface strength, and the biaxially stretched films have problems with respect to surface strength and stretchability, though they have no problems with anisotropy of physical properties thereof. Further, both films generally tend to possess high rigidity, which is not desirable in some uses.

One approach for removing anisotropy of physical properties of the film and improving surface strength is to conduct stretching at a stretching ratio as low as possible to render the film porous. However, no satisfactory results have so far been obtained.

In order to impart pliability to film, it is considered to add a low-melting polymer, a rubbery material, a plasticizer, a surfactant, and the like. However, there have so far been found no films having satisfactorily balanced physical properties such as porosity, stretchability, surface strength, etc.

As a result of intensive investigations to provide a porous film or sheet which removes the above-described defects with the conventional porous film or sheet, which, when monoaxially stretched, shows well balanced physical properties and possesses a strong surface strength and a high pliability, and which, when biaxially stretched, shows excellent surface strength, excellent stretchability, and a high pliability, the inventors have achieved the present invention.

SUMMARY OF THE INVENTION

Accordingly, one object of the present invention is to provide a process for producing a porous film or sheet, which comprises melt-molding a composition prepared by compounding 25 to 400 parts by weight of a filler and 1 to 100 parts by weight of a liquid or waxy hydrocarbon polymer with 100 parts by weight of a polyolefin resin, into film or sheet, and stretching the resulting film or sheet.

DETAILED DESCRIPTION OF THE INVENTION

The polyolefin resin used in the present invention is a high density polyethylene, polypropylene, a copolymer thereof with other α-olefin, etc. They may be used alone or in combination of two or more of them. Of these resins, high density polyethylene, polypropylene, and linear low density polyethylene are preferred.

The linear low density polyethylene resin is a copolymer of ethylene and α-olefin, and is different from a conventional low density polyethylene resin produced by a high pressure process. The linear low density polyethylene resin is produced by a low pressure process, and the α-olefin includes butene, hexene, octene, decene, etc. The low density polyethylene resin produced by a high pressure process is different from the low density polyethylene resin by a low pressure process in that the former resin has a many branched structure and the latter has a straight chain structure.

The linear low density polyethylene resin can be produced by various processes. Different processes provide physically somewhat different linear low density polyethylene resins, and those which have an MI (melt index; g/10 min) of 0.1 to 5 and the density $\rho$ (g/cc) of 0.91 to 0.94 are used in the present invention.

Resins having an MI of less than 0.1 have poor extrudability and provide low producibility, whereas resins having an MI of more than 5 provide a reduced molding stability upon filming.

On the other hand, when $\rho$ is less than 0.91, the film or sheet produced has insufficient porosity and dimensional stability, though it shows excellent pliability and, when $\rho$ is more than 0.94, the pliability is spoiled.

Above all, linear low density polyethylene resins having MI of 0.5 to 2.5 and $\rho$ of 0.91 to 0.93 are preferred from the point of moldability and physical properties of resulting films.

As the fillers, inorganic and organic fillers are used. Examples of the inorganic fillers include calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, asbestos powder, glass powder, zeolite, silica clay, etc. Of these fillers, calcium carbonate, talc, clay, silica, diatomaceous earth and barium sulfate are particularly preferred.

As the organic fillers, cellulose type powders such as wood powder, pulp powder, etc., can be used. These are used alone or in combination.

The fillers have a mean particle size of not more than 30$\mu$, preferably not more than 10$\mu$, most preferably 1 to 5$\mu$.

If the particle size is too large, resulting stretched products have a poor pore denseness and, if too small, the filler has a poor dispersibility in resin and a poor moldability.

From the point of view of dispersibility in resin and stretchability, the fillers are desirably surface-treated. Surface treatment with a fatty acid or a metal salt thereof provides desired results.

As the liquid or waxy hydrocarbon polymers, grease wax (low-polymerized polyethylene wax), atactic polypropylene, liquid polybutadiene, liquid butene, etc., can be used. Of these, hydroxy-terminated liquid polybutadiene provides particularly good results. The hydroxy-terminated liquid polybutadiene is a polybutadiene having reactive hydroxy groups as terminal groups.

In addition, derivatives of hydroxy-terminated liquid polybutadiene can be used as well. Examples of such derivatives include liquid products having isocyanate-, maleic anhydride- or epoxy-modified terminal.

Further, polybutadiene hydrogenated products obtained by hydrogenating the above-described liquid polybutadiene can be preferably used. In particular, polyhydroxy saturated hydrocarbon polymers obtained by hydrogenating hydroxy-terminated liquid polybutadiene are preferable. As the polyhydroxy saturated hydrocarbon polymers, hydrocarbon polymers which have at least 1.0 hydroxy group per molecule, have a saturated or mostly saturated main chain, and have a number-average molecular weight (measured by vapor pressure method) of 400 to 48,000, preferably 500 to 20,000, are used. If the number-average molecular weight is too small, there results insufficient weatherability and, if too large, there results such a reduced fluidity that handling of such resin is difficult. The average number of hydroxy groups per molecule is not less than 1.0, preferably 1.5 to 5.0. The hydroxy groups are preferably at the terminal ends of main chain and long branched chains.

Such polyhydroxy saturated hydrocarbon polymers can be obtained by known processes, for example, by hydrogenating a butadiene liquid polymer obtained by radical polymerization of butadiene solely or together with a copolymerizable monomer using a polymerization initiator such as hydrogen peroxide. Examples of the copolymerizable monomer are isoprene, chloroprene, styrene, methyl acrylate, methyl methacrylate, methyl vinyl ether, etc.

The hydrogenation is conducted in conventional manner using a nickel catalyst (e.g., reduced nickel, Raney nickel, etc.), a cobalt catalyst, a platinum catalyst, a palladium catalyst, a rhodium catalyst, a ruthenium catalyst, or a mixed or alloy catalyst thereof.

Introduction of the polymer having polar groups at the terminals into a system of a polyolefin resin and a filler is believed to provide good results with respect to improvement of compatibility between the polyolefin resin and the filler.

The use of such polyhydroxy saturated hydrocarbon polymer serves to improve dispersibility of the filler, and tear resistance, weatherability and heat resistance of resulting film or sheet as compared with the case of using liquid polybutadiene, liquid polybutene, or unsaturated hydroxy hydrocarbon polymer having hydroxy groups at the terminals thereof.

Additionally, a stabilizer against heat or ultraviolet rays, pigment, an antistatic agent, a fluorescent agent, etc., may be added to polyolefin resin in the conventional manner.

In compounding the polyolefin resin, filler, and liquid or waxy hydrocarbon polymer, compounding proportions thereof are preferably as follows: 100 parts by weight of the polyolefin resin is compounded with 25 to 400 parts by weight of the filler and 1 to 100 parts by weight of the liquid or waxy hydrocarbon polymer.

If the amount of the filler is less than 25 parts by weight, pores are not fully formed in stretched film, thus porosity being reduced and, if more than 400 parts by weight, there results poor kneadability, dispersibility, and film- or sheet-forming properties, and a reduced surface strength of stretched products.

In the present invention, particularly preferable compounding proportion of the polyolefin resin to the filler is 100 parts by weight of the resin to 60 to 250 parts by weight of the filler. As to the compounding proportion of the liquid or waxy hydrocarbon polymer, characteristic properties of the polyolefin resin deteriorate when the amount of the liquid or waxy hydrocarbon polymer exceeds 100 parts by weight, thus satisfactory kneadability, film- or sheet-forming properties and stretchability being unable to be attained.

In the present invention, more preferred amount of the hydrocarbon polymer compounded ranges from 5 to 50 parts by weight, most preferably from 7 to 30 parts by weight.

Compounding of the polyolefin resin with the filler and the liquid or waxy hydrocarbon polymer is conducted by placing these materials in an ordinary blender or mixer and mixing them. However, the following mixing method is preferred in the point of mixing efficiency, dispersibility of the filler, and film- or sheet-forming properties.

The polyolefin resin is used as a powder of 10- to 150-mesh particles, with 30- to 80-mesh particles being more preferred in uniformity and handling easiness.

As the mixer, a drum tumbler mixer, a ribbon blender, a Henschel mixer, a super mixer, etc., are used. High speed agitation type mixers such as a Henschel mixer is desirably used.

Order of the mixing is as follows. First, the polyolefin resin powder is placed in such a mixer, and the liquid or waxy hydrocarbon polymer is added thereto, followed by sufficient stirring to uniformly spread the liquid or waxy hydrocarbon polymer on the surface of the polyolefin resin. Then, the filler is added thereto, and resulting mixture is stirred to obtain a final mixed composition.

This method has the advantages that it prevents formation of agglomerate upon directly contacting the liquid or waxy hydrocarbon polymer with the filler to disperse, and it enables to improve dispersibility of the filler in the polyolefin resin upon kneading.

Kneading of the mixture is preferably conducted using conventionally known apparatuses such as an ordinary screw kneader, a twin screw extruder, a mixing roll, a Bumbury's mixer, a biaxial kneader, etc.

Addition of the liquid or waxy hydrocarbon polymer enables to remarkably reduce kneading torque in any kneading method, thus being useful for using a small size apparatus and saving electric power, etc.

Molding of film or sheet may be conducted according to ordinary film- or sheet-molding method using ordinary molding apparatuses. For example, inflation method using a circular die (ring die) or T-die molding method using a T-die may be properly employed. Selection of the molding method depends upon stretching manner described below.

That is, in monoaxial stretching, roll stretching is usually preferred. However, tubular stretching wherein stretching in one direction (take-off direction) is conducted may also be employed.

Stretching may be conducted in one step or in two or more steps.

Characteristic aspects of the composition of the present invention in monoaxial stretching are as follows.

(i) Films with high porosity can be obtained even at a low stretching ratio. That is, at a low stretching ratio, interface between matrix and filler is separated to form so-called voids.

Therefore, even at a stretching ratio as low as 1.2 times, the film is rendered porous and undergoes whitening, which is an extremely unique phenomenon. Stretching at such a low stretching ratio enables to depress anisotropy of physical properties of resulting film or sheet and provides high surface strength.

(ii) Film of the composition has a low stretching stress.

The film can be stretched with a low stress due to the improvement of pliability of raw film and due to the possibility of rendering the film porous at a low stretching ratio as described above. This is quite advantageous in that small size and simple equipment can be used, leading to reduction of production cost.

(iii) Stretching can be conducted at low temperatures.

Stretching temperature can be reduced, which also relates to (i) and (ii). Surprisingly, temperatures at which films are rendered porous range from the temperature for stretching polyolefin resin alone to ordinary temperature. This is quite advantageous from the point of view of equipment and energy saving.

Usually, filler containing films or sheets are made porous by stretching 3.5 to 6 times. However, films or sheets comprising the composition of the present invention are rendered porous by stretching 1.2 to 6 times when high density polyethylene or polypropylene is used, or by stretching 1.1 to 4 times when linear low density polyethylene is used. However, from the point of view of making the film or sheet porous and reduction in anisotropy of physical properties of the film or sheet, the stretching ratio is preferably 1.5 to 3 times when high density polyethylene or the like is used, or 1.3 to 3 times when linear low density polyethylene is used.

Characteristic aspects in biaxial stretching are described below.

The composition showed extremely good stretchability in both simultaneous biaxial stretching and successive biaxial stretching.

In biaxial stretching, too, stretching at a low stretching ratio is possible. Uniform stretching and rendering the film porous can be attained by stretching 1.2 times in at least one direction in the case of using high density polyethylene or the like, or by stretching 1.1 times in at least one direction in the case of using linear low density polyethylene. Thus, porous films with a strong surface strength can be obtained.

Usually, in the case of using high density polyethylene or the like, enough stretching ratio to render the film porous and realize uniform stretching is at least 1.2 to 4.0 times, preferably 1.2 to 2.0 times, in one direction. In the case of using linear low density polyethylene, stretching is conducted with a stretching ratio of 1.1 to 3 times, preferably 1.1 to 2 times, in at least one direction.

Film precision can be stabilized by subjecting mono- or biaxially stretched film to heat treatment. In addition, conventional surface treatment such as corona treatment or flame treatment can be also employed.

The thus obtained film has the following properties.
(i) Porosity:

Since they have open cells, they possess excellent moisture and gas permeability, and have good water pressure resistance.

(ii) Mechanical Properties:

Monoaxially stretched film or sheet has well balanced mechanical properties in longitudinal and transverse directions due to reduced anisotropy. In particular, tear resistance in longitudinal (stretched) direction is good. In addition, surface strength can be increased.

Biaxially stretched film or sheet has more reduced anisotropy, and enables to increase surface resistance.

Both monoaxially stretched and biaxially stretched films or sheets have good pliability.

(iii) Workability:

The film or sheet permits heat seal and shrink wrapping.

(iv) Incineration Easiness:

The film or sheet can be easily incinerated without generation of any poisonous gas.

The film or sheet obtained by the present invention can find various applications utilizing the above described properties.

For example, they can be used for clothes (waterproof products, rain wear, sports wear, etc.) utilizing permeability, cell separators, filtering materials (for removal of dust in air, removal of mist, or for treating industrial waste water), medical materials, etc.

The present invention will now be described in more detail by reference to examples of preferred embodiments of the present invention which, however, are not to be construed as limiting the present invention in any way.

EXAMPLE 1

20 kg of high density polyethylene resin (NOVATEC BR$^{002}$; "NOVATEC" being a trade name under Mitsubishi Chemical Industries, Ltd.) was stirred and mixed with 5 kg of hydroxy-terminated liquid polybutadiene (trade name: R-45HT, made by IDEMITSU PETROCHEMICAL CO., LTD., 2.3 to 2.5 hydroxy groups per molecule) in a Henschel mixer. Then, 25 kg of calcium carbonate (mean particle size: 1.2μ; processed with fatty acid) was added thereto, followed by stirring and mixing the mixture.

The thus obtained mixture was kneaded in a double screw kneader, DSM-65 (Double Screw Mixer; made by Japan Steel Works, Ltd.), and granulated.

The product was subjected to inflation molding using a 40 mm diameter extruder to form a 130μ thick film. Extrusion conditions were as follows.

Cylinder temperature: 150°–180°–180° C.
Head, Dies temperature: 180° C.
Take-off speed: 4 m/min
Blow-up ratio: 1.3
Lay-flat width: 300 mm The thus obtained film was monoaxially stretched using a roll stretching machine. Stretching conditions were as follows:

Stretching temperature 100° C.
Stretching ratio: 2.2 times
Stretching speed: 4.4 m/min The thus stretched film was found to be rendered porous and fully whitened without irregular stretching, and was a porous film having beautiful surface.

Properties of this film were shown in Table 1.

Additionally, methods for measuring the film-evaluating items are as described below. (The same methods were employed in Examples and Comparative Examples to be described hereinafter.)

(1) Stretchability:
◎ : no breakage, uniform stretching, and no irregular stretching
o: no breakage and almost no irregular stretching
Δ: no breakage and slightly irregular stretching
x: breakage or seriously irregular stretching (2) Porosity Porosity was calculated from film density according to the following formula:

$$\text{Porosity (\%)} = \frac{D_o - D}{D_o} \times 100 \, (\%)$$

wherein
$D_o$: density (g/cm$^3$) of raw film, and

D: density (g/cm³) of stretched film.

(3) Strength and Elongation:

Measured according to ASTM 882-64 T using samples of 20 mm in width and 50 mm in length; grip separation rate: 50 mm/min.

(4) Tear Strength:

Measured according to JIS P-8116 using samples of 14 mm in width and 110 mm in length.

(5) Permeability:

Permeability was measured according to ASTM E26-66(E).

(6) Surface Strength:

A cellophane tape was applied to a sample and rapidly delaminated to rate the state of delaminated surface according to the following standard.
⊚ : no surface delamination
o: scarce surface delamination
Δ: slight surface delamination
x: serious surface delamination (7) Pliability:

Pliability of a sample was rated according to the following standard by touching with hand.
⊚ : extremely soft
o: soft
Δ: slightly hard
x: hard Additionally, symbols in Tables 1 to 14 are as tabulated in Table A below. (The same applies in Examples and Comparative Examples to be described hereinafter.)

TABLE A

| | Symbol | Content |
|---|---|---|
| Polyolefin | A-1 | High density polyethylene (NOVATEC BR$^{002}$; made by Mitsubishi Chemical Industries, Ltd.) |
| | A-2 | High density polyethylene (NOVATEC ER$^{002}$; made by Mitsubishi Chemical Industries, Ltd.) |
| | A-3 | Polypropylene (NOVATEC P 4200Y; made by Mitusbishi Chemical Industries, Ltd.) |
| | A-4 | Linear low density polyethylene (Ultzex 2021NF; made by Mitsui Petrochemical Industries, Ltd.) |
| Filler | B-1 | Calcium carbonate (mean particle size: 1.2μ; processed with fatty acid; made by Shiraishi Calcium Kaisha Ltd.) |
| | B-2 | Talc (MS Talc; made by NIPPON TALC CO., LTD.) |
| | B-3 | Diatomaceous earth (made by Hokushu Keisodo, Ltd.) |
| Hydrocarbon Polymer | C-1 | Hydroxy-terminated liquid polybutadiene (R-45HT; made by IDEMITSU PETROCHEMICAL CO., LTD.) |
| | C-2 | Hydroxy-terminated liquid polybutadiene (Nisso PB-G 2000; made by Nippon Soda Co., Ltd.) |
| | C-3 | Liquid polybutene (Nisseki Polybutene LV-150; made by Nippon Petrochemicals Co., Ltd.) |
| Hydrocarbon Polymer | C-4 | Liquid polybutene (Nisseki Polybutene HV-300; made by Nippon Petrochemicals Co., Ltd.) |
| | C-5 | Polyhydroxy saturated hydrocarbon polymer (hydrogenated product of C-1; obtained in Reference Example 1) |
| | C-6 | Polyhydroxy saturated hydrocarbon polymer (hydrogenated product of C-2; obtained in Reference Example 2) |
| | C-7 | Rubbery polybutadiene (TUFPRENE A; made by Asahi Chemical Industry Co., Ltd.) |
| | C-8 | Rubbery EPR (TAFMER P0480; made by Mitsui Petrochemical Industries, Ltd.) |

EXAMPLES 2 TO 8

In the same manner as in Example 1 except changing stretching temperature and stretching ratio as shown in Table 1, there were obtained porous films. Properties of the resulting films were evaluated. Results thus obtained are tabulated in Table 1.

EXAMPLES 9 TO 13

In the same manner as in Example 1 except changing the compounding proportions of polyolefin, filler, and hydroxy-terminated liquid polybutadiene, there were obtained porous films. Properties of the resulting films were evaluated. Results thus obtained are given in Table 1.

COMPARATIVE EXAMPLES 1 TO 5

In the same manner as in Example 1 except compounding no hydroxy-terminated liquid polybutadiene and changing stretching temperature and stretching ratio, there were obtained porous films. Properties of the resulting films were evaluated. Results thus obtained are tabulated in Table 2.

COMPARATIVE EXAMPLES 6 TO 8

In the same manner as in Example 1 except changing the compounding proportions of polyolefin, filler, and hydroxy-terminated liquid polybutadiene as shown in Table 2, there were obtained porous films. Properties of the resulting films were evaluated. Results thus obtained are tabulated in Table 2.

EXAMPLES 14 TO 18

Samples prepared by using liquid polybutadiene (Nisso PB-G 2000; made by Nippon Soda Co., Ltd.; having 1.6 to 1.7 hydroxy groups per molecule) as hydroxy-terminated liquid polybutadiene or liquid polybutene (Nisseki Polybutene LV-150; made by Nippon Petrochemical Co., Ltd.) and using talc (MS Talc; made by NIPPON TALC CO., LTD.) or diatomaceous earth as filler were made into raw films in the same manner as in Example 1, then subjected to monoaxial stretching. Film properties were evaluated in the same manner. Results thus obtained are shown in Table 3.

COMPARATIVE EXAMPLES 9 TO 11

In the same manner as in Example 1 except adding rubbery polybutadiene (TUFPRENE A; "TUF-PRENE" being a registered trade name under Asahi Chemical Industry Co., Ltd.) or rubbery ethylene/α-olefin copolymer (TAFMER P-0480; "TAFMER" being a trade name under Mitsui Petrochemical Industries, Ltd.) in place of the hydroxy-terminated liquid polybutadiene, there were prepared raw films. They were then monoaxially stretched and similarly evaluated. Results thus obtained are shown in Table 3.

EXAMPLES 19 & 20

In the same manner as in Example 1 except using a polypropylene resin (NOVATEC P4200Y; "NOVA-TEC" being a trade name under Mitsubishi Chemical Industries, Ltd.) in place of the high density polyethylene resin, there were obtained raw films. They were then monoaxially stretched and similarly evaluated. Results thus obtained are shown in Table 3.

EXAMPLES 21 TO 27

Raw films were prepared employing the same compounding and the same methods as in Examples 1, 19 and 20, and subjected to successive biaxial stretching and simultaneous biaxial stretching using a film stretcher (made by T. M. LONG CO., INC. USA).

In the biaxial stretching, uniform stretching was realized at a low stretching ratio in every case. Properties of the resulting films were evaluated in the same manner as in Example 1. Results thus obtained are shown in Table 4.

COMPARATIVE EXAMPLES 12 & 13

Raw films were prepared by compounding in the same manner as in Comparative Examples 1 to 5 without compounding the hydroxy-terminated liquid polybutadiene, followed by biaxially stretching in the same manner as in Examples 21 to 27. Properties of the thus obtained films were evaluated in the same manner as in Example 1. Results thus obtained are shown in Table 4.

TABLE 1

| Ex. | Composition (parts by weight) Poly-olefin | Filler | Hydro-carbon Polymer | Thickness of Raw Sheet (μ) | Stretching Conditions Temp. (°C.) | Stretching Ratio | Stretch-ability | Thickness of Stretched Film (μ) | Porosity (%) | Strength and Elongation (MD/TD) *3 | *4 | *1 | *2 |
|---|---|---|---|---|---|---|---|---|---|---|---|---|---|
| 1 | A-1 (40) | B-1 (50) | C-1 (10) | 130 | 100 | 2.2 | ⊙ | 84 | 30 | 125/44 | 86/230 | 2530 | ⊙ |
| 2 | A-1 (40) | B-1 (50) | C-1 (10) | " | " | 1.5 | ⊙ | 103 | 19 | 111/52 | 106/189 | 1920 | ⊙ |
| 3 | A-1 (40) | B-1 (50) | C-1 (10) | " | " | 1.2 | ○ | 121 | 15 | 103/57 | 121/180 | 1300 | ⊙ |
| 4 | A-1 (40) | B-1 (50) | C-1 (10) | " | " | 3.0 | ⊙ | 70 | 37 | 134/36 | 50/211 | 3100 | ○ |
| 5 | A-1 (40) | B-1 (50) | C-1 (10) | " | " | 4.0 | ⊙ | 57 | 42 | 144/27 | 32/170 | 4080 | Δ |
| 6 | A-1 (40) | B-1 (50) | C-1 (10) | " | 85 | 2.2 | ⊙ | 88 | 33 | 111/49 | 101/259 | 2700 | ⊙ |
| 7 | A-1 (40) | B-1 (50) | C-1 (10) | " | 50 | " | ○ | 92 | 35 | 105/51 | 110/271 | 3120 | ○ |
| 8 | A-1 (40) | B-1 (50) | C-1 (10) | " | * | " | ○ | 95 | 37 | 114/52 | 120/290 | 3000 | Δ |
| 9 | A-1 (45) | B-1 (50) | C-1 (5) | " | 100 | " | ○ | 79 | 25 | 160/60 | 120/100 | 2370 | ⊙ |
| 10 | A-1 (30) | B-1 (50) | C-1 (20) | " | " | " | ○ | 99 | 40 | 40/14 | 30/313 | 3180 | ○ |
| 11 | A-1 (70) | B-1 (20) | C-1 (10) | " | " | " | ⊙ | 72 | 18 | 312/111 | 127/341 | 1800 | ⊙ |
| 12 | A-1 (55) | B-1 (35) | C-1 (10) | " | " | " | ⊙ | 79 | 25 | 218/77 | 106/295 | 2320 | ⊙ |
| 13 | A-1 (30) | B-1 (60) | C-1 (10) | " | " | " | ⊙ | 133 | 55 | 62/22 | 91/192 | 3840 | Δ |

*1: Permeability to moisture (g/m² · 24 hrs)
*2: Surface strength
*3: Strength (kg/cm²)
*4: Elongation (%)
*: Ordinary temperature

TABLE 2

| Comp. Ex. | Composition (parts by weight) Poly-olefin | Filler | Hydro-carbon Polymer | Thickness of Raw Sheet (μ) | Stretching Conditions Temp. (°C.) | Stretching Ratio | Stretch-ability | Thickness of Stretched Film (μ) | Porosity (%) | Strength and Elongation (MD/TD) *3 | *4 | *1 | *2 |
|---|---|---|---|---|---|---|---|---|---|---|---|---|---|
| 1 | A-1 (50) | B-1 (50) | — | 130 | 110 | 2.2 | x | — | — | — | — | — | — |
| 2 | A-1 (50) | B-1 (50) | — | " | " | 3.0 | x | — | — | — | — | — | — |
| 3 | A-1 (50) | B-1 (50) | — | " | " | 4.0 | Δ | 54 | 38 | 420/52 | 24/20 | 3400 | x |

TABLE 2-continued

| Comp. Ex. | Composition (parts by weight) Polyolefin | Filler | Hydrocarbon Polymer | Thickness of Raw Sheet (μ) | Stretching Conditions Temp. (°C.) | Stretching Ratio | Stretchability | Thickness of Stretched Film (μ) | Porosity (%) | Strength and Elongation (MD/TD) *3 | *4 | *1 | *2 |
|---|---|---|---|---|---|---|---|---|---|---|---|---|---|
| 4 | A-1 (50) | B-1 (50) | — | " | " | 6.0 | ⊙ | 44 | 50 | 500/39 | 17/12 | 3700 | x |
| 5 | A-1 (50) | B-1 (50) | — | " | 80 | 2.0 | x | — | — | — | — | — | — |
| 6 | A-1 (20) | B-1 (50) | C-1 (30) | * | — | — | — | — | — | — | — | — | — |
| 7 | A-1 (80) | A-1 (10) | C-1 (10) | 130 | 110 | 2.2 | ○ | 60 | <1 | 376/133 | 142/380 | <50 | ⊙ |
| 8 | A-1 (10) | A-1 (80) | C-1 (10) | * | — | — | — | — | — | — | — | — | — |

*: Poor filming properties
*1: Permeability to moisture (g/m² · 24 hrs)
*2: Surface strength
*3: Strength (kg/cm²)
*4: Elongation (%)

TABLE 3

| | Composition (parts by weight) Polyolefin | Filler | Hydrocarbon Polymer | Thickness of Raw Sheet (μ) | Stretching Conditions Temp. (°C.) | Stretching Ratio | Stretchability | Thickness of Stretched Film (μ) | Porosity (%) | Strength and Elongation (MD/TD) *3 | *4 | *1 | *2 |
|---|---|---|---|---|---|---|---|---|---|---|---|---|---|
| Ex. 14 | A-1 (40) | B-1 (50) | C-2 (10) | 130 | 100 | 2.2 | ○ | 76 | 21 | 140/54 | 95/240 | 1450 | ⊙ |
| Ex. 15 | A-1 (40) | B-1 (50) | C-2 (10) | " | " | 1.5 | Δ | 100 | 16 | 131/68 | 112/210 | 1200 | ⊙ |
| Ex. 16 | A-1 (40) | B-1 (50) | C-3 (10) | " | " | " | Δ | 74 | 19 | 145/50 | 100/235 | 1400 | ⊙ |
| Ex. 17 | A-1 (40) | B-2 (50) | C-1 (10) | " | " | 2.2 | ⊙ | 88 | 36 | 110/40 | 20/210 | 3150 | ⊙ |
| Ex. 18 | A-1 (40) | B-3 (50) | C-1 (10) | " | " | " | ⊙ | 91 | 35 | 140/42 | 60/180 | 3500 | ⊙ |
| Comp. Ex. 9 | A-1 (40) | B-1 (50) | C-7 (10) | " | " | " | x | — | — | — | — | — | — |
| Comp. Ex. 10 | A-1 (40) | B-1 (50) | C-7 (10) | " | " | 3.0 | ⊙ | 45 | <1 | 300/100 | 40/70 | <50 | x |
| Comp. Ex. 11 | A-1 (40) | B-1 (50) | C-8 (10) | " | " | 2.0 | x | — | — | — | — | — | — |
| Ex. 19 | A-3 (40) | B-1 (50) | C-1 (10) | " | " | 2.2 | ⊙ | 78 | 23 | 190/45 | 50/200 | 2000 | ⊙ |
| Ex. 20 | A-3 (40) | B-1 (50) | C-1 (10) | " | " | 3.0 | ⊙ | 69 | 34 | 215/30 | 30/150 | 2800 | ○ |

*1: Permeability to moisture (g/m² · 24 hrs)
*2: Surface strength
*3: Strength (kg/cm²),
*4: Elongation (%)

TABLE 4

| | Composition (parts by weight) Polyolefin | Filler | Hydrocarbon Polymer | Thickness of Raw Sheet (μ) | Stretching Conditions Temp. (°C.) | Stretching Ratio | Stretchability | Thickness of Stretched Film (μ) | Porosity (%) | Strength and Elongation (MD/TD) *3 | *4 | *1 | *2 |
|---|---|---|---|---|---|---|---|---|---|---|---|---|---|
| Ex. 21 | A-1 (40) | B-1 (50) | C-1 (10) | 500 | 116 | Successive 1.2 × 1.2 | ⊙ | 440 | 21 | — | — | 2210 | ⊙ |
| Ex. 22 | A-1 (40) | B-1 (50) | C-1 (10) | " | " | Successive 1.5 × 1.5 | ⊙ | 340 | 34 | — | — | 3220 | ⊙ |
| Ex. 23 | A-1 (40) | B-1 (50) | C-1 (10) | " | " | Successive 2.0 × 2.0 | ⊙ | 260 | 51 | — | — | 4700 | ○ |
| Ex. 24 | A-1 (40) | B-1 (50) | C-1 (10) | " | " | Simultaneous 1.5 × 1.5 | ⊙ | 350 | 36 | — | — | 4000 | Δ |
| Ex. 25 | A-1 (40) | B-1 (50) | C-1 (10) | " | " | Simultaneous 2.0 × 2.0 | ⊙ | 280 | 55 | — | — | 4700 | ⊙ |
| Ex. 26 | A-3 (40) | B-1 (50) | C-1 (10) | " | 140 | Successive 1.5 × 1.5 | ⊙ | 320 | 30 | — | — | 3560 | ⊙ |
| Ex. 27 | A-3 (40) | B-1 (50) | C-1 (10) | " | " | Simultaneous 1.5 × 1.5 | ⊙ | 330 | 32 | — | — | 3800 | ⊙ |
| Comp. | A-1 | B-1 | — | " | 120 | Successive | x | — | — | — | — | — | — |

TABLE 4-continued

| | Composition (parts by weight) | | | Thickness of Raw Sheet (μ) | Stretching Conditions | | Stretchability | Thickness of Stretched Film (μ) | Porosity (%) | Strength and Elongation (MD/TD) | | | |
|---|---|---|---|---|---|---|---|---|---|---|---|---|---|
| | Polyolefin | Filler | Hydrocarbon Polymer | | Temp. (°C.) | Stretching Ratio | | | | *3 | *4 | *1 | *2 |
| Ex. 12 Comp. Ex. 13 | (50) A-1 (50) | (50) B-1 (50) | — | " | " | 1.5 × 1.5 Successive 3.0 × 3.0 | Δ | — | — | — | — | — | — |

*1: Permeability to moisture (g/m² · 24 hrs),
*2: Surface strength,
*3: Strength (kg/cm²),
*4: Elongation (%)

REFERENCE EXAMPLE 1

Preparation of polyhydroxy saturated hydrocarbon polymer 3 kg of a commercially available polyhydroxypolybutadiene (R-45HT; made by IDEMITSU PETROCHEMICAL CO., LTD.; number average molecular weight Mn: 3110; hydroxy group content: 0.82 meq/g; cis-1,4: 15%; trans-1,4: 58%; vinyl: 27%), 3 kg of cyclohexane, and 300 g of a ruthenium-on-carbon (5%) catalyst (made by Nippon Engelhard, Ltd.) were charged in a 10-liter volume autoclave and, after replacing the atmosphere within the autoclave by a purified argon gas, a highly purified hydrogen gas was fed into the autoclave with simultaneous heating. The reaction system reached a stationary state (inside temperature: about 100° C.; inside pressure: about 50 kg/cm²) in about 30 minutes. After maintaining this condition for 15 minutes, the hydrogenation reaction was discontinued, and the resulting polymer was purified and dried in a conventional manner.

IR absorption spectrum analysis of the thus obtained polymer showed that the polymer was a saturated hydrocarbon polymer having almost no double bonds. Hydroxy group content of the hydrogenated product was 0.8 meq/g (2.5 in hydroxy group number per molecule).

REFERENCE EXAMPLE 2

Preparation of polyhydroxy saturated hydrocarbon polymer

Hydrogenation was conducted in the same manner as in Reference Example 1 except for using liquid polybutadiene (NISSO PB-G 2000; made by Nippon Soda Co., Ltd.; molecular weight: 2000) as polyhydroxypolybutadiene. The thus obtained polymer had an iodine value of 5 g/100 g and a hydroxyl value of 44 KOH mg/g (1.6 in hydroxy group number per molecule), and was a liquid product with a viscosity of 775 poises at 30° C.

EXAMPLE 28

20 kg of a high density polyethylene resin (NOVATEC BR002; "NOVATEC" being a trade name under Mitsubishi Chemical Industries, Ltd.) was stirred and mixed with 5 kg of a polyhydroxy saturated hydrocarbon polymer (obtained in Reference Example 2) in a Henschel mixer. Then, 25 kg of calcium carbonate (mean particle size: 1.2μ; processed with fatty acid) was added thereto, followed by stirring and mixing.

The thus obtained mixture was kneaded in a double screw mixer, DSM-65 (Double Screw Mixer; made by Japan Steel Works, Ltd.), and granulated.

The product was subjected to inflation molding to form 70μ thick film. Extrusion conditions were as follows.

Cylinder temperature: 170°-190°-210°-230° C.
Head, Dies temperature: 230° C.
Take-off speed: 8 m/min
Blow ratio: 2.0
Lay-flat width: 314 mm The thus obtained film was monoaxially stretched using a roll stretching machine.

Stretching conditions were as follows.
Stretching temperature: 80° C.
Stretching ratio: 2.2 times
Stretching speed: 11.0 m/min The thus stretched film was found to be rendered porous and fully whitened without irregular stretching, and was a porous film having beautiful surface.

Properties of this film are shown in Table 5.

EXAMPLES 25 TO 35

In the same manner as in Example 28 except for changing the stretching temperature and stretching ratio as shown in Table 5, there were obtained porous films. Properties of the resulting films were evaluated. Results thus obtained are tabulated in Table 5.

EXAMPLES 36 TO 40

In the same manner as in Example 28 except for changing the compounding proportions of polyolefin, filler, and polyhydroxy saturated hydrocarbon polymer, there were obtained porous films. Properties of the resulting films were evaluated. Results thus obtained are tabulated in Table 5.

EXAMPLES 41 TO 44

In the same manner as in Example 28 except using as polyhydroxy saturated hydrocarbon polymer that obtained in Reference Example 1 (shown by C-5 in Table) and stretching at 80° C. with changing stretching ratio, there were obtained porous films. Properties of the resulting films were evaluated in the same manner. Results thus obtained are tabulated in Table 6.

COMPARATIVE EXAMPLES 14 TO 18

In the same manner as in Example 28 except compounding no polyhydroxy saturated hydrocarbon polymer and changing stretching temperature and stretching ratio, there were obtained porous films. Properties of the resulting films were evaluated. Results obtained are tabulated in Table 7.

COMPARATIVE EXAMPLES 19 TO 21

In the same manner as in Example 28 except changing the compounding proportions of polyolefin, filler, and polyhydroxy saturated hydrocarbon polymer as given in Table 7, there were obtained porous films. Properties of the resulting films were evaluated, and results thus obtained are tabulated in Table 7.

EXAMPLES 45 & 46

Samples prepared by using talc (MS Talc; made by NIPPON TALC CO., LTD.) or diatomaceous earth as filler were made into raw films in the same manner as in Example 28, then monoaxially stretched. Film properties were similarly evaluated. Results thus obtained are shown in Table 8.

COMPARATIVE EXAMPLES 22 TO 24

In the same manner as in Example 28 except adding as a third ingredient rubbery polybutadiene (TUFPRENE A; "TUFPRENE" being a trade name under Asahi Chemical Industry Co., Ltd.) or rubbery ethylene/α-olefin copolymer (TAFMER P0480; "TAFMER" being a trade name under Mitsui Petrochemical Industries, Ltd.) in lieu of the polyhydroxy saturated hydrocarbon polymer, there were prepared raw films. They were then monoaxially stretched and similarly evaluated. Results thus obtained are shown in Table 8.

EXAMPLES 47 & 48

In the same manner as in Example 28 except using polypropylene resin (NOVATEC P4200Y; "NOVATEC" being a trade name under Mitsubishi Chemical Industries, Ltd.) in place of the high density polyethylene resin, there were obtained raw films. They were then monoaxially stretched and similarly evaluated. Results thus obtained are shown in Table 8.

EXAMPLES 49 TO 55

Raw films were prepared employing the same compounding and the same methods as in Examples 28, 47, and 48, and subjected to successive and simultaneous biaxial stretching using a film stretcher (made by T. M. LONG CO., INC. USA).

In the biaxial stretching, uniform stretching was realized at a low stretching ratio in every case. Properties of the resulting films were evaluated in the same manner as in Example 28. Results thus obtained are shown in Table 9.

COMPARATIVE EXAMPLES 25 & 26

Raw films were prepared by compounding in the same manner as in Comparative Examples 14 to 18 without compounding polyhydroxy saturated hydrocarbon polymer, followed by biaxial stretching in the same manner as in Examples 49 to 55. Properties of the thus obtained films were evaluated in the same manner as in Example 28. Results thus obtained are shown in Table 9.

EXAMPLES 56 & 57

Compounding was conducted in the same manner as in Example 28 in a Henschel mixer using polyhydroxy saturated hydrocarbon polymer obtained in Reference Example 1 or 2. Then, the resulting compound was kneaded in a Banbury mixer and pressed into 2 mm thick pieces (press temperature: 190° C.).

Heat resistance and weatherability of the sample pieces were measured. Heat resistance was evaluated in terms of tensile break elongation after leaving in a 100° C. autoclave, and weatherability in terms of tensile break elongation after accelerated test (after 100 hours and after 1,000 hours) in a sunshine carbon arc type weather meter (made by SUGA TEST INSTRUMENTS CO., LTD.). Results thus obtained are shown in Table 10.

Additionally, "blank" in Table 10 presents break elongation of the pressed pieces without being subjected to the accelerated test.

COMPARATIVE EXAMPLE 27

In the same manner as in Example 28 except adding rubbery polybutadiene (TUFPRENE A; made by Asahi Chemical Industry Co., Ltd.), there was obtained a pressed piece to examine heat resistance and weatherability. Results thus obtained are shown in Table 10.

TABLE 5

| Ex. | Composition (parts by weight) Polyolefin | Filler | Hydrocarbon Polymer | Thickness of Raw Sheet (μ) | Stretching Conditions Temp. (°C.) | Stretching Ratio | Stretchability | Thickness of Stretched Film (μ) | Porosity (%) | Tear Strength (kg · cm/cm²) | *1 | *2 |
|---|---|---|---|---|---|---|---|---|---|---|---|---|
| 28 | A-1 (40) | B-1 (50) | C-6 (10) | 70 | 80 | 2.2 | ⊙ | 50 | 36 | 9.6 | 2750 | ⊙ |
| 29 | " | " | " | " | " | 1.5 | ⊙ | 60 | 22 | 11.5 | 2090 | ⊙ |
| 30 | " | " | " | " | " | 1.2 | ○ | 65 | 10 | 13.0 | 1410 | ⊙ |
| 31 | " | " | " | " | " | 3.0 | ⊙ | 43 | 46 | 6.5 | 3370 | ○ |
| 32 | " | " | " | " | " | 4.0 | ⊙ | 37 | 53 | 4.5 | 4430 | △ |
| 33 | " | " | " | " | 100 | 2.2 | ⊙ | 48 | 34 | 9.5 | 2280 | ⊙ |
| 34 | " | " | " | " | 60 | " | ○ | 52 | 39 | 9.0 | 2880 | ○ |
| 35 | " | " | " | " | * | " | ○ | 54 | 41 | 8.3 | 2960 | △ |
| 36 | A-1 (45) | " | C-1 (5) | " | 80 | " | △ | 48 | 34 | 11.5 | 1890 | ⊙ |
| 37 | A-1 (30) | " | C-1 (20) | " | " | " | ○ | 48 | 34 | 3.8 | 1380 | ○ |
| 38 | A-1 (70) | B-1 (20) | C-1 (10) | " | " | " | △ | 41 | 22 | 19.5 | 350 | ⊙ |
| 39 | A-1 (55) | B-1 (35) | " | " | " | " | △ | 45 | 29 | 13.7 | 1580 | ⊙ |
| 40 | A-1 (30) | B-1 (60) | " | " | " | " | ⊙ | 54 | 41 | 7.1 | 3270 | △ |

*: Ordinary temperature,
*1: Permeability to moisture (g/m² · 24 hrs),
*2: surface strength

TABLE 6

| Ex. | Composition (parts by weight) Poly-olefin | Filler | Hydro-carbon Polymer | Thickness of Raw Sheet ($\mu$) | Stretching Conditions Temp. (°C.) | Stretching Ratio | Stretch-ability | Thickness of Stretched Film ($\mu$) | Porosity (%) | Tear Strength (kg · cm/cm$^2$) | *1 | *2 |
|---|---|---|---|---|---|---|---|---|---|---|---|---|
| 41 | A-1 (40) | B-1 (50) | C-5 (10) | 70 | 80 | 2.2 | ◉ | 48 | 34 | 9.9 | 2200 | ◉ |
| 42 | " | " | " | " | " | 1.5 | ○ | 57 | 18 | 11.9 | 1670 | ◉ |
| 43 | " | " | " | " | " | 1.2 | ○ | 63 | 7 | 13.4 | 1130 | ◉ |
| 44 | " | " | " | " | " | 3.0 | ◉ | 41 | 43 | 6.7 | 2700 | ◉ |

*1: Permeability to moisture (g/m$^2$ · 24 hrs)
*2: Surface strength

TABLE 7

| Comp. Ex. | Composition (parts by weight) Poly-olefin | Filler | Hydro-carbon Polymer | Thickness of Raw Sheet ($\mu$) | Stretching Conditions Temp. (°C.) | Stretching Ratio | Stretch-ability | Thickness of Stretched Film ($\mu$) | Porosity (%) | Tear Strength (kg · cm/cm$^2$) | *1 | *2 |
|---|---|---|---|---|---|---|---|---|---|---|---|---|
| 14 | A-1 (50) | B-1 (50) | — | 70 | 110 | 2.2 | x | — | — | — | — | — |
| 15 | A-1 (50) | B-1 (50) | — | " | " | 3.0 | x | — | — | — | — | — |
| 16 | A-1 (50) | B-1 (50) | — | " | " | 4.0 | △ | 40 | 56 | 5.5 | 3700 | x |
| 17 | A-1 (50) | B-1 (50) | — | " | " | 6.0 | ◉ | 32 | 64 | 3.7 | 4020 | x |
| 18 | A-1 (50) | B-1 (50) | — | " | 80 | 2.0 | x | — | — | — | — | — |
| 19 | A-1 (20) | B-1 (50) | C-6 (30) | ** | — | — | — | — | — | — | — | — |
| 20 | A-1 (80) | B-1 (10) | C-6 (10) | 70 | 110 | 2.2 | x | 34 | 6 | 21.8 | <50 | ◉ |
| 21 | A-1 (10) | B-1 (80) | C-6 (10) | ** | — | — | — | — | — | — | — | — |

*1: Permeability of moisture (g/m$^2$ · 24 hrs)
*2: Surface strength
**: Poor filming properties

TABLE 8

| | Composition (parts by weight) Poly-olefin | Filler | Hydro-carbon Polymer | Thickness of Raw Sheet ($\mu$) | Stretching Conditions Temp. (°C.) | Stretching Ratio | Stretch-ability | Thickness of Stretched Film ($\mu$) | Porosity (%) | Tear Strength (kg · cm/cm$^2$) | *1 | *2 |
|---|---|---|---|---|---|---|---|---|---|---|---|---|
| Ex. 45 | A-1 (40) | B-2 (50) | C-6 (10) | 70 | 80 | 2.2 | ◉ | 51 | 38 | 7.7 | 3420 | ◉ |
| Ex. 46 | A-1 (40) | B-3 (50) | C-6 (10) | " | " | " | ◉ | 52 | 39 | 9.3 | 8800 | ◉ |
| Comp. Ex. 22 | A-1 (40) | B-1 (50) | C-7 (10) | " | " | " | x | — | — | — | — | — |
| Comp. Ex. 23 | A-1 (40) | B-1 (50) | C-7 (10) | " | " | 3.0 | ◉ | 30 | 22 | 13.5 | 50 | x |
| Comp. Ex. 24 | A-1 (40) | B-1 (50) | C-8 (10) | " | " | 2.0 | x | — | — | — | — | — |
| Ex. 47 | A-3 (40) | B-1 (50) | C-6 (10) | " | " | 2.2 | ◉ | 43 | 26 | 6.5 | 2170 | ◉ |
| Ex. 48 | A-3 (40) | B-1 (50) | C-6 (10) | " | " | 3.0 | ◉ | 38 | 39 | 4.7 | 3040 | ○ |

*1: Permeability to moisture (g/m$^2$ · 24 hrs)
*2: Surface strength

TABLE 9

| | Composition (parts by weight) Poly-olefin | Filler | Hydro-carbon Polymer | Thickness of Raw Sheet ($\mu$) | Stretching Conditions Temp. (°C.) | Stretching Ratio | Stretch-ability | Thickness of Stretched Film ($\mu$) | Porosity (%) | Tear Strength (kg · cm/cm$^2$) | *1 | *2 |
|---|---|---|---|---|---|---|---|---|---|---|---|---|
| Ex. 49 | A-1 (40) | B-1 (50) | C-6 (10) | 70 | 80 | Successive 1.2 × 1.2 | ◉ | 65 | 25 | 18.5 | 2400 | ◉ |
| Ex. 50 | A-1 | B-1 | C-6 | " | " | Successive | ◉ | 60 | 48 | 17.0 | 3100 | ◉ |

TABLE 9-continued

| | Composition (parts by weight) | | | Thickness of Raw Sheet (μ) | Stretching Conditions | | Stretch-ability | Thickness of Stretched Film (μ) | Porosity (%) | Tear Strength (kg·cm/cm²) | *1 | *2 |
|---|---|---|---|---|---|---|---|---|---|---|---|---|
| | Polyolefin | Filler | Hydrocarbon Polymer | | Temp. (°C.) | Stretching Ratio | | | | | | |
| Ex. 51 | A-1 (40) | B-1 (50) | C-6 (10) | " | " | 1.5 × 1.5 Successive | ⊙ | 50 | 65 | 12.5 | 4210 | ○ |
| Ex. 52 | A-1 (40) | B-1 (50) | C-6 (10) | " | " | 2.0 × 2.0 Simultaneous | ⊙ | 61 | 49 | 16.0 | 3800 | △ |
| Ex. 53 | A-1 (40) | B-1 (50) | C-6 (10) | " | " | 1.5 × 1.5 Simultaneous | ⊙ | 51 | 66 | 12.0 | 5110 | ⊙ |
| Ex. 54 | A-3 (40) | B-1 (50) | C-6 (10) | " | 140 | 2.0 × 2.0 Successive | ⊙ | 58 | 46 | 8.5 | 3870 | ⊙ |
| Ex. 55 | A-3 (40) | B-1 (50) | C-6 (10) | " | " | 1.5 × 1.5 Simultaneous | ⊙ | 59 | 47 | 8.0 | 4130 | ⊙ |
| Comp. Ex. 25 | A-1 (50) | B-1 (50) | — | " | 120 | 1.5 × 1.5 Successive | x | — | — | — | — | — |
| Comp. Ex. 26 | A-1 (50) | B-1 (50) | — | " | " | 3.0 × 3.0 Successive | △ | — | — | — | — | — |

*1: Permeability to moisture (g/m²·24 hrs),
*2: Surface strength

TABLE 10

| | Composition (parts by weight) | | | Tensile Break Elongation (%) | | | | |
|---|---|---|---|---|---|---|---|---|
| | | | | | Heat Resistance | | Weatherability | |
| | Polyolefin | Filler | Hydrocarbon Polymer | Blank | After 100 Hrs | After 1,000 Hrs | After 100 Hrs | After 1,000 Hrs |
| Example 56 | A-1 (40) | B-1 (50) | C-6 (10) | 600 | 550 | 540 | 570 | 560 |
| Example 57 | " | " | C-5 (10) | 550 | 500 | 490 | 530 | 500 |
| Comparative Example 27 | " | " | C-7 (10) | 20 | 5 | 2 | 10 | 1 |

EXAMPLE 58

20 kg of linear low density polyethylene resin (Ultzex 2021 NF; "Ultzex" being a trade name under Mitsui Petrochemical Industries, Ltd.) was stirred and mixed with 5 kg of polyhydroxy saturated hydrocarbon polymer in a Henschel mixer obtained in Reference Example 2. Then, 25 kg of calcium carbonate (mean particle size: 1.2μ; processed with fatty acid) was added thereto, followed by stirring and mixing the mixture.

The thus obtained mixture was kneaded in a double screw kneader, DSM-65 (Double Screw Mixer; made by Japan Steel Works, Ltd.), and granulated.

The product was subjected to inflation molding using a 40 φ extruder to form a 70μ thick film. Extrusion conditions were as follows.

Cylinder temperature: 170°-190°-210°-230° C.
Head, Dies temperature: 200° C.
Take-off speed: 8 m/min
Blow-up ratio: 2.0
Lay-flat width: 314 mm The thus obtained film was monoaxially stretched using a roll stretching machine. Stretching conditions were as follows.

Stretching temperature: 80° C.
Stretching ratio: 2.2 times
Stretching speed: 11.0 m/min The thus stretched film was rendered porous and fully whitened, and was a porous film having beautiful surface.

Properties of this film were shown in Table 11.

EXAMPLES 59 TO 64

In the same manner as in Example 58 except for changing stretching temperature and stretching ratio as shown in Table 11, there were obtained porous films. Properties of the resulting films were evaluated. Results thus obtained are tabulated in Table 11.

EXAMPLES 65 TO 67

In the same manner as in Example 58 except for changing the compounding proportions of polyolefin, filler, and liquid hydrocarbon polymer, there were obtained porous films. Properties of the resulting films were evaluated. Results thus obtained are shown in Table 11.

COMPARATIVE EXAMPLES 28 TO 32

In the same manner as in Example 58 except for compounding no liquid hydrocarbon polymer and changing stretching temperature and stretching ratio, there were obtained porous films. Properties of the resulting films were evaluated. Results thus obtained are shown in Table 12.

EXAMPLES 68 TO 72

Samples prepared by using liquid polybutadiene (Nisso PBG; made by Nippon Soda Co., Ltd.) or liquid polybutene (Nisseki Polybutene HV-300; made by Nippon Petrochemical Co., Ltd.) as liquid hydrocarbon polymer and using talc (MS Talc; made by NIPPON TALC CO., LTD.) or diatomaceous earth as filler were made into raw films in the same manner as in Example 58, then subjected to monoaxial stretching. Film properties were evaluated in the same manner. Results thus obtained are shown in Table 13.

COMPARATIVE EXAMPLES 33 TO 35

In the same manner as in Example 58 except for adding rubbery polybutadiene (TUFPRENE A; "TUF- PRENE" being a trade name under Asahi Chemical Industry Co., Ltd.) or rubbery ethylene/α-olefin copolymer (TAFMER P0480; "TAFMER" being a trade name under Mitsui Petrochemical Industries, Ltd.) in place of the liquid hydrocarbon polymer, there were prepared raw films. They were then monoaxially stretched and similarly evaluated. Results thus obtained are shown in Table 13.

EXAMPLES 73 TO 79

Raw films were prepared employing the same compounding and the same methods as in Example 58, and subjected to successive and simultaneous biaxial stretching using a film stretcher (made by T. M. LONG CO., INC. USA).

In the biaxial stretching, uniform stretching was realized at a low stretching ratio in every case. Properties of the resulting films were evaluated in the same manner as in Example 58. Results thus obtained are shown in Table 14.

COMPARATIVE EXAMPLES 36 & 37

Raw films were prepared by compounding in the same manner as in Comparative Examples 28 to 32 without compounding liquid hydrocarbon polymer, followed by biaxially stretching in the same manner as in Examples 73 to 77. Properties of the thus obtained films were evaluated in the same manner as in Example 58. Results thus obtained are shown in Table 14.

TABLE 11

| Ex. | Composition (parts by weight) | | | *5 | Stretching Conditions | | Stretch-ability | *6 | Poros-ity (%) | Strength and Elongation (MD/TD) | | Tear Strength (kg·cm/cm²) | *1 | Plia-bility | *2 |
|---|---|---|---|---|---|---|---|---|---|---|---|---|---|---|---|
| | Poly-olefin | Filler | Hydro-carbon Polymer | | Temp. (°C.) | Stretch-ing Ratio | | | | Strength (kg/cm²) | *4 | | | | |
| 58 | A-4 (40) | B-1 (50) | C-6 (10) | 70 | 80 | 2.2 | ⊙ | 50 | 43 | 138/48 | 140/350 | 11.5 | 4950 | ⊙ | ⊙ |
| 59 | A-4 (40) | B-1 (50) | C-6 (10) | " | " | 1.5 | ⊙ | 60 | 26 | 122/57 | 170/284 | 13.8 | 3760 | ⊙ | ⊙ |
| 60 | A-4 (40) | B-1 (50) | C-6 (10) | " | " | 1.2 | ○ | 65 | 12 | 113/63 | 194/271 | 15.6 | 2540 | ○ | ⊙ |
| 61 | A-4 (40) | B-1 (50) | C-6 (10) | " | " | 3.0 | ⊙ | 43 | 55 | 147/40 | 80/317 | 7.8 | 6070 | ⊙ | ○ |
| 62 | A-4 (40) | B-1 (50) | C-6 (10) | " | 95 | 2.2 | ⊙ | 50 | 38 | 124/54 | 162/389 | 11.4 | 4100 | ⊙ | ⊙ |
| 63 | A-4 (40) | B-1 (50) | C-6 (10) | " | 50 | " | ⊙ | 50 | 47 | 116/56 | 176/407 | 10.8 | 5180 | ⊙ | ○ |
| 64 | A-4 (40) | B-1 (50) | C-6 (10) | " | * | " | ○ | 52 | 49 | 125/57 | 192/435 | 10.0 | 5330 | ○ | △ |
| 65 | A-4 (45) | B-1 (50) | C-6 (5) | " | 80 | " | ○ | 48 | 41 | 176/66 | 192/150 | 13.8 | 3610 | ⊙ | ⊙ |
| 66 | A-4 (55) | B-1 (35) | C-6 (10) | " | " | " | ⊙ | 48 | 35 | 237/88 | 159/443 | 16.4 | 2840 | ⊙ | ⊙ |
| 67 | A-4 (30) | B-1 (60) | C-6 (10) | " | " | " | ⊙ | 52 | 49 | 75/28 | 137/288 | 8.5 | 5890 | ⊙ | △ |

*: Ordinary temperature,
*1: Permeability to moisture (g/m² · 24 hrs),
*2: Surface strength,
*4: Elongation (%),
*5: Thickness of raw sheet (μ),
*6: Thickness of stretched film (μ)

TABLE 12

| Comp. Ex. | Composition (parts by weight) | | | *5 | Stretching Conditions | | Stretch-ability | *6 | Poros-ity (%) | Strength and Elongation (MD/TD) | | *7 | *1 | Plia-bility | *2 |
|---|---|---|---|---|---|---|---|---|---|---|---|---|---|---|---|
| | Poly-olefin | Filler | Hydro-carbon Polymer | | Temp. (°C.) | Stretch-ing Ratio | | | | *3 | *4 | | | | |
| 28 | A-4 (50) | B-1 (50) | — | 70 | 100 | 2.2 | x | — | — | — | — | — | — | — | — |
| 29 | A-4 (50) | B-1 (50) | — | " | " | 3.0 | x | — | — | — | — | — | — | — | — |
| 30 | A-4 (50) | B-1 (50) | — | " | " | 4.0 | x | — | — | — | — | — | — | — | — |
| 31 | A-4 (50) | B-1 (50) | — | " | " | 6.0 | △ | 33 | 69 | 500/39 | 26/18 | 4.4 | 7240 | ⊙ | △ |
| 32 | A-4 (50) | B-1 (50) | — | " | 80 | 2.0 | x | — | — | — | — | — | — | — | — |

*1: Permeability to moisture (g/m² · 24 hrs)
*2: Surface strength
*3: Strength (kg/cm²)
*4: Elongation (%)
*5: Thickness of raw sheet (μ)
*6: Thickness of stretched film (μ)
*7: Tear strength (kg · cm/cm²)

TABLE 13

| | Composition (parts by weight) | | | | Stretching Conditions | | | | Porosity (%) | Strength and Elongation | | *7 | *1 | Plia-bility | *2 |
|---|---|---|---|---|---|---|---|---|---|---|---|---|---|---|---|
| | Poly-olefin | Filler | Hydro-carbon Polymer | *5 | Temp. (°C.) | Stretch-ing Ratio | *8 | *6 | | *3 | *4 | | | | |
| Ex. 68 | A-4 (40) | B-1 (50) | C-2 (10) | 70 | 80 | 2.2 | ◉ | 48 | 41 | 154/59 | 143/360 | 9.4 | 2840 | ◉ | ◉ |
| Ex. 69 | A-4 (40) | B-1 (50) | C-2 (10) | " | " | 1.5 | ○ | 56 | 20 | 144/75 | 168/315 | 11.9 | 1800 | ◉ | ◉ |
| Ex. 70 | A-4 (40) | B-1 (50) | C-3 (10) | " | " | " | ○ | 51 | 9 | 160/55 | 150/353 | 10.6 | 2740 | ◉ | ◉ |
| Ex. 71 | A-4 (40) | B-2 (50) | C-6 (10) | " | " | 2.2 | ◉ | 51 | 40 | 121/44 | 30/315 | 9.2 | 5770 | ◉ | ◉ |
| Ex. 72 | A-4 (40) | B-3 (50) | C-6 (10) | " | " | " | ◉ | 52 | 40 | 154/46 | 90/270 | 11.2 | 6350 | ◉ | ◉ |
| Comp. Ex. 33 | A-4 (40) | B-1 (50) | C-7 (10) | " | " | " | △ | 42 | 11 | 280/125 | 95/137 | 19.7 | 360 | ◉ | ○ |
| Comp. Ex. 34 | A-4 (40) | B-1 (50) | C-7 (10) | " | " | 3.0 | ◉ | 37 | 26 | 300/100 | 60/98 | 14.2 | 50 | ◉ | ○ |
| Comp. Ex. 35 | A-4 (40) | B-1 (50) | C-8 (10) | " | " | 2.0 | x | — | — | — | — | — | — | — | — |

*1: Permeability to moisture (g/m² · 24 hrs),
*2: Surface strength,
*3: Strength (kg/cm²),
*4: Elongation (%),
*5: Thickness of raw sheet (μ),
*6: Thickness of stretched film (μ),
*7: Tear strength (kg · cm/cm²),
*8: Stretchability

TABLE 14

| | Composition (parts by weight) | | | | Stretching Conditions | | | | Poros-ity (%) | Strength and Elongation | | *7 | *1 | Plia-bility | *2 |
|---|---|---|---|---|---|---|---|---|---|---|---|---|---|---|---|
| | Poly-olefin | Filler | Hydro-carbon Polymer | *5 | Temp. (°C.) | Stretching Ratio | *8 | *6 | | *3 | *4 | | | | |
| Ex. 73 | A-4 (40) | B-1 (50) | C-6 (10) | 70 | 80 | Successive 1.2 × 1.2 | ◉ | 66 | 30 | 98/95 | 210/240 | 18.7/ 20.2 | 4270 | ◉ | ◉ |
| Ex. 74 | A-4 (40) | B-1 (50) | C-6 (10) | " | " | Successive 1.5 × 1.5 | ◉ | 62 | 47 | 97/95 | 173/192 | 17.0/ 17.7 | 5730 | ◉ | ◉ |
| Ex. 75 | A-4 (40) | B-1 (50) | C-6 (10) | " | " | Successive 2.0 × 2.0 | ◉ | 51 | 67 | 98/97 | 147/155 | 16.0/ 16.4 | 8760 | ◉ | ○ |
| Ex. 76 | A-4 (40) | B-1 (50) | C-6 (10) | " | " | Simultaneous 1.5 × 1.5 | ◉ | 62 | 48 | 97/97 | 181/183 | 16.7/ 17.0 | 6120 | ◉ | △ |
| Ex. 77 | A-4 (40) | B-1 (50) | C-6 (10) | " | " | Simultaneous 2.0 × 2.0 | ◉ | 52 | 69 | 99/97 | 151/153 | 15.7/ 16.0 | 9110 | ◉ | ◉ |
| Ex. 78 | A-2 (40) | B-1 (50) | C-6 (10) | " | " | Successive 1.5 × 1.5 | ◉ | 60 | 48 | 91/87 | 138/161 | 17.0/ 17.9 | 3100 | ◉ | ◉ |
| Ex. 79 | A-2 (40) | B-1 (50) | C-6 (10) | " | " | Simultaneous 1.5 × 1.5 | ◉ | 61 | 49 | 92/89 | 142/165 | 16.2/ 16.8 | 3800 | ◉ | ◉ |
| Comp. Ex. 36 | A-6 (50) | B-1 (50) | — | " | 100 | Successive 1.5 × 1.5 | △ | — | — | — | — | — | — | — | — |
| Comp. Ex. 37 | A-6 (50) | B-1 (50) | — | " | " | Successive 3.0 × 3.0 | △ | — | — | — | — | — | — | — | — |

*1: Permeability to moisture (g/m² · 24 hrs),
*2: Surface strength,
*3: Strength (kg/cm²),
*4: Elongation (%),
*5: Thickness of raw sheet (μ),
*6: Thickness of stretched film (μ),
*7: Tear strength (kg · cm²),
*8: Stretchability It is seen from the above Examples that films obtained by the process of the present invention possess well balanced excellent properties including stretchability.

On the other hand, films not using the liquid or waxy hydrocarbon polymer as is different from the films of the present invention undergo breakage upon monoaxial stretching or irregular stretching and, even when they are safely stretched, resulting films possess low tear strength, etc. In some cases, the resulting films have extremely low pliability.

As is clear from the above results, films or sheets obtained from the composition prepared by compounding the polyolefin resin with the filler and the liquid or waxy hydrocarbon polymer show excellent stretchability, can be rendered porous even at a low stretching ratio, and have beautiful surface with excellent pliability.

Further, they possess well balanced physical properties of tear strength and permeability and are expected to find wide applications as films or sheets.

While the invention has been described in detail and with reference to specific embodiments thereof, it will be apparent to one skilled in the art that various changes and modifications can be made therein without departing from the spirit and scope thereof.

What is claimed is:

1. A process for producing a porous film or sheet, which comprises melt-molding a composition prepared by compounding 100 parts by weight of at least one polyolefin resin selected from the group consisting of a linear low density polyethylene having a density of 0.91 or more, a high density polyethylene, and a polypropylene with 25 to 400 parts by weight of at least one filler having a mean particle size of not more than 30µ selected from the group consisting of inorganic fillers and cellulose type organic fillers and 1 to 100 parts by weight of at least one liquid hydrocarbon polymer, selected from the group consisting of liquid polybutene, liquid polybutadiene, and hydrogenated liquid polybutadiene having a saturated or mostly saturated main chain into a film or sheet, and stretching the resulting film or sheet.

2. The process as in claim 1, wherein said liquid polybutadiene and hydrogenated liquid polybutadiene polymer contains 1.5 to 5.0 hydroxy groups per molecule.

3. The process as in claim 1, wherein compounding of said composition is conducted by first dispersing and spreading said hydrocarbon polymer in said polyolefin resin powder, and then mixing the product with said filler.

4. The process as in claim 1, wherein said stretching treatment is a monoaxial stretching.

5. The process as in claim 1, wherein said stretching treatment is a biaxial stretching.

* * * * *

UNITED STATES PATENT AND TRADEMARK OFFICE
CERTIFICATE OF CORRECTION

PATENT NO. : 4,472,328

DATED : September 18, 1984

INVENTOR(S) : Masaaki Sugimoto et al

It is certified that error appears in the above-identified patent and that said Letters Patent is hereby corrected as shown below:

Column 7, lines 10-11, delete "ASTM E 26-66(E)" and substitute therefore --ASTM E 96-66(E)--.

Signed and Sealed this

Eighteenth Day of March 1986

[SEAL]

Attest:

DONALD J. QUIGG

Attesting Officer

Commissioner of Patents and Trademarks